(12) United States Patent
Gargi et al.

(10) Patent No.: US 7,425,963 B2
(45) Date of Patent: Sep. 16, 2008

(54) HIERARCHICAL IMAGE FEATURE-BASED VISUALIZATION

(75) Inventors: Ullas Gargi, Mountain View, CA (US); Daniel R. Tretter, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1376 days.

(21) Appl. No.: 09/904,627

(22) Filed: Jul. 16, 2001

(65) Prior Publication Data

US 2003/0093437 A1 May 15, 2003

(51) Int. Cl.
G09G 5/02 (2006.01)
G06F 7/00 (2006.01)
G06F 17/30 (2006.01)

(52) U.S. Cl. .................. 345/589; 345/676; 707/2; 707/3; 707/4; 707/5; 707/6; 707/7; 707/8; 707/9; 707/102; 707/104.1; 382/165; 382/239

(58) Field of Classification Search .......... 707/2–9, 707/10, 103, 104, 102, 104.1; 345/835, 589, 345/850, 676; 382/165, 239
See application file for complete search history.

(56) References Cited

U.S. PATENT DOCUMENTS

| 5,463,702 | A | * | 10/1995 | Trueblood | 382/239 |
| 5,528,259 | A | * | 6/1996 | Bates et al. | 345/676 |
| 5,845,288 | A | * | 12/1998 | Syeda-Mahmood | 707/102 |
| 5,852,823 | A | * | 12/1998 | De Bonet | 707/6 |
| 6,084,595 | A | * | 7/2000 | Bach et al. | 345/589 |
| 6,121,969 | A | * | 9/2000 | Jain et al. | 345/850 |
| 6,240,423 | B1 | * | 5/2001 | Hirata | 707/104.1 |
| 6,285,995 | B1 | * | 9/2001 | Abdel-Mottaleb et al. | 707/3 |
| 6,415,282 | B1 | * | 7/2002 | Mukherjea et al. | 707/3 |
| 6,564,202 | B1 | * | 5/2003 | Schuetze et al. | 707/2 |
| 6,584,221 | B1 | * | 6/2003 | Moghaddam et al. | 382/165 |
| 6,732,119 | B2 | * | 5/2004 | Ganapathy et al. | 707/104.1 |

OTHER PUBLICATIONS

Rubner, Y.: "Perceptual Metrics for Image Database Navigation" Online! http://citeseer.nj.nec.com/cache/papers/cs/7951 May 1999 Standford University XP002248557 pp.99-127.

Faloutsos, C. et al: "Fastmap: A Fast Algorithm for Indexing, data-Mining and Multimedia Datasets" Proceeding of the 1995 ACM SIGMOD International Conference on Management of Data. Oneline htte://citerseer.nj.nec.com/cache/papers/cs/1213 XP00224556.

Greg Pass, "Histogram Refinement for Content-Based Image Retrieval," Computer Science Department, Cornell University, Ithaca, NY 14853, gregpass,redz@cs.cornell.edu, http://www.cs.cornell.edu/home/rdz/refinement.html.

(Continued)

*Primary Examiner*—Jin-Cheng Wang

(57) ABSTRACT

A method of visualizing and retrieving data files includes displaying a plurality of images representing data files on a display device using a first distance metric between each data file. A portion of the images is redisplayed on the display device using a refined distance metric. Optionally, the method repeats the redisplaying step until a desired data file is identifiable. Then, the desired data file is retrieved.

20 Claims, 9 Drawing Sheets

OTHER PUBLICATIONS

Jing Huang, et al., "Image Indexing Using Color Correlograms," Cornell University, Ithaca, NY 14853.

Hideyuki Tamura, et al., "Textural Features Corresponding to Visual Perception," 1978 IEEE, pp. 460-472.

Raouf F.H. Farag et al., "Quantitative Evaluation of Computer Regenerated Images and Their Use in Storage-Restricted Environments," 1978 IEEE, pp. 473.

Christos Faloutsos, et al., "Fast Map: A Fast Algorithm for Indexing, Data-Mining and Visualization of Traditional and Multimedia Datasets," pp. 1-25.

Jianchang Mao et al., "Texture Classification and Segmentation UsingMultiresolution Simultaneous Autoregressive Models," Pattern Recognition, vol. 25, No. 2, pp. 173-188, 1992.

Yossi Rubner, "Perceptual Metrics for Image Database Navigation," Computer Science Department of Stanford University, pp. 1-161.

W. Niblack et al., "The QBIC Project: Querying Images By Content Using Color, Texture, and Shape," IBM Research Division, Almaden Research Center, SPIE vol. 1908 (1993) pp. 173-187.

Michael J. Swain, "Color Indexing," International Journal of Computer Vision, 7.1, 11-32 (1991), pp. 11-32.

* cited by examiner

HIERARCHICAL IMAGE FEATURE-BASED VISUALIZATION

BACKGROUND

1. Field of the Invention

The present invention relates to multimedia database and classification systems, and in particular to automatic classification and retrieval of multimedia files based on the features of the multimedia files.

2. Background Information

Automatic image classification has many important applications. Large image databases or collections require good indexing mechanisms so that images can be categorized effectively, browsed efficiently, and retrieved quickly. Conventional systems store and retrieve specific information from a database using, for example, descriptive information regarding the image file, such as file creation date, file name, file extension and the like. This form of image classification is not significantly different from the classification of any other digital information.

By relying on the file information, only cursory information can be obtained about the file and nothing at all specifically related to the image. For example, an image file could have a name that has no relation to the features or content of the image, such as a black and white image could have the file name "color_image". Other systems provide classification based on the content of the images, such as flowers, dogs, and the like. In practice, this is usually done by keyword annotation, which is a laborious task.

The amount of multimedia information available today due to the evolution of the internet, low-cost devices (e.g., digital video cameras, digital cameras, video capture cards, scanners and the like) to generate multimedia content, and low-cost storage (e.g., hard disks, CDs, and the like) increases the need to classify and retrieve relevant multimedia data efficiently. Unlike text-based retrieval, where keywords are successfully used to index into documents, multimedia data retrieval has no easily accessed indexing feature.

One approach to navigating through a collection of images for the purpose of image retrieval is disclosed by Yossi, R., "Perceptual Metrics for Image Database Navigation," PHD Dissertation, Stanford University May 1999, which is incorporated herein by reference in its entirety. The appearance of an image is summarized by distributions of color or texture features, and a metric is defined between any two such distributions. This metric, called the "Earth Mover's Distance" (EMD), represents the least amount of work that is needed to rearrange the images from one distribution to the other. The EMD measures perceptual dissimilarity which is desirable for image retrieval. Multi-Dimensional Scaling (MDS) is employed to embed a group of images as points in a 2- or 3-dimensional (2D or 3D) Euclidean space so that their distances reflect the image dissimilarities. This structure allows the user to better understand the result of a database query and to refine the query. The user can iteratively repeat the process to zoom into the portion of the image space of interest.

Feature extraction is a key component to generating systems that can organize multimedia files based on their content. References that address image feature extraction include the following articles. Niblack, et al., "The QBIC Project: Querying Images by Content Using Color, Texture, and Shape," Proc. of SPIE, Storage and Retrieval for Image and Video Databases, Vol. 1908, February 1993, San Jose, pp. 173-187, which describes using color histograms for image distance measurement and is hereby incorporated by reference. M. J. Swain and D. H. Ballard, "Color Indexing," International Journal of Computer Vision, Vol. 7, No. 1, pp. 11-32, 1991, which describes histogram intersection techniques and is hereby incorporated by reference. G. Pass and R. Zabih, "Histogram Refinement for Content-based Image Retrieval," IEEE Workshop on Applications of Computer Vision, pp. 96-102, 1996, which describes a color coherence vector and is hereby incorporated by reference. J. Huang, et al., "Image Indexing Using Color Correlogram," IEEE Int. Conf. on Computer Vision and Pattern Recognition, pp. 762-768, Puerto Rico, June 1997, which describes the use of color correlograms as features in indexing images and is hereby incorporated by reference. H. Tamura, S. Mori, and T. Yamawaki, "Texture Features Corresponding to Visual Perception," IEEE Trans. On Systems, Man, and Cybernetics, vol. 8, no. 6, June 1978, which describes the use of texture as features in images processing and is hereby incorporated by reference. M. K. Hu, "Visual Pattern Recognition by Moment Invariants," IEEE computer Society, Los Angeles, Calif., 1977, which describes the use of moment invariants as features in images processing and is hereby incorporated by reference. J. Mao and A. K. Jain, "Texture Classification and Segmentation Using Multiresolution Simultaneous Autoregressive Models," Pattern Recognition, Vol. 25, No. 2, pp. 173-188, 1992, which describes Multiresolution Simultaneous Autoregressive Model (MRSAR) texture features and is hereby incorporated by reference.

Since visualizing and retrieving large databases of multimedia files are complex tasks, it is desired to have a method for visualizing and retrieving data files that provides a distance calculation that starts at a coarse level of feature differences and progressively increases to a fine level of feature differences as the number of data files displayed is decreased. Additionally, it is desired to have an interactive real time system that allows a user to interactively select portions of the displayed data files to search and retrieve data files from large databases.

SUMMARY OF THE INVENTION

The present invention is directed to methods and systems for visualizing and retrieving data files. An exemplary method comprises: displaying a plurality of images representing data files on a display device using a first distance metric between each data file; redisplaying a portion of the images on the display device using a refined distance metric; and retrieving the desired data file.

An exemplary method of interactively retrieving data files in real time comprises: displaying plural images, each image corresponding to a data file, on a display device using a first distance metric between each data file; interactively selecting, by a user, a portion of the images; redisplaying the portion of the images in real time on the display device using a refined distance metric; and retrieving a desired data file.

BRIEF DESCRIPTION OF THE DRAWINGS

The above features and advantages of the invention, and additional features and advantages of the invention, will be better appreciated from the following detailed description of the invention made with reference to the drawings, wherein.

DETAILED DESCRIPTION OF THE PREFERRED EMBODIMENTS

Figure 1:
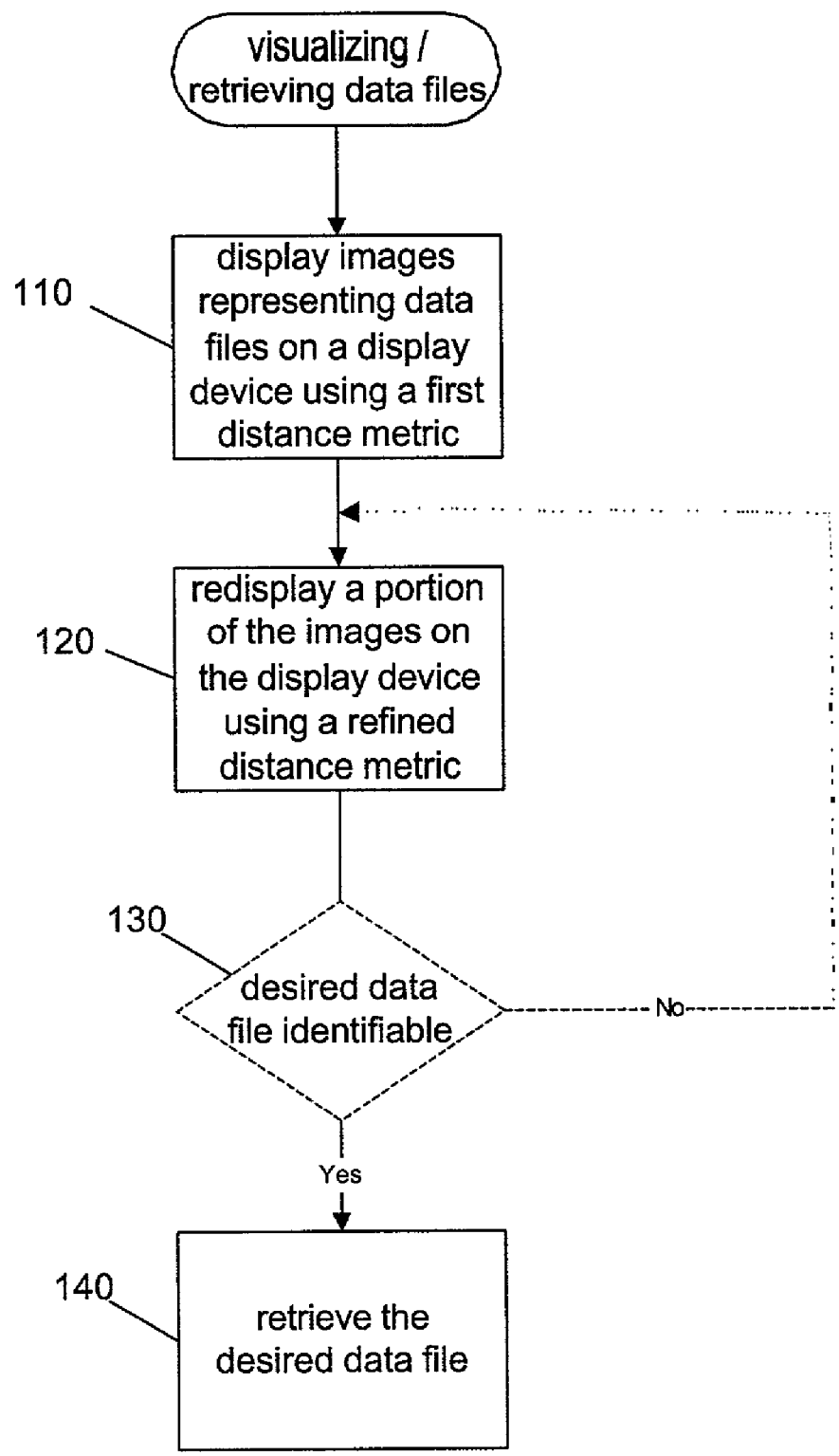
FIG. 1 shows a flow chart of an exemplary method of the present invention.

FIG. 1 is a flow chart of an exemplary method of visualizing and retrieving data files. The method begins in step 110 by displaying a plurality of images representing data files on a display device using a first (i.e., coarse) distance metric between each data file. According to alternate exemplary embodiments, the data file can be a segment of a large data file. In step 120, a portion of the images can be redisplayed on the display device using a refined distance metric. Optionally, in step 130, the redisplaying step can be repeated until a desired data file is identifiable. The distance metric can be refined further at each redisplay until the desired data file is found or a maximum refined distance metric (e.g., all image feature data are used to calculate the distance metric) is reached. The desired data file can be retrieved in step 140. Alternatively, the desired data file can be marked, selected, and the like, as will be appreciated by those skilled in the art. For instance, the desired data file can be marked for later processing by another program. Furthermore, those skilled in the art will appreciate that many additions and variations can be added to the above process steps while still keeping within the scope of the invention. Some of these alternate embodiments will be described in the following text.

Figure 2A:
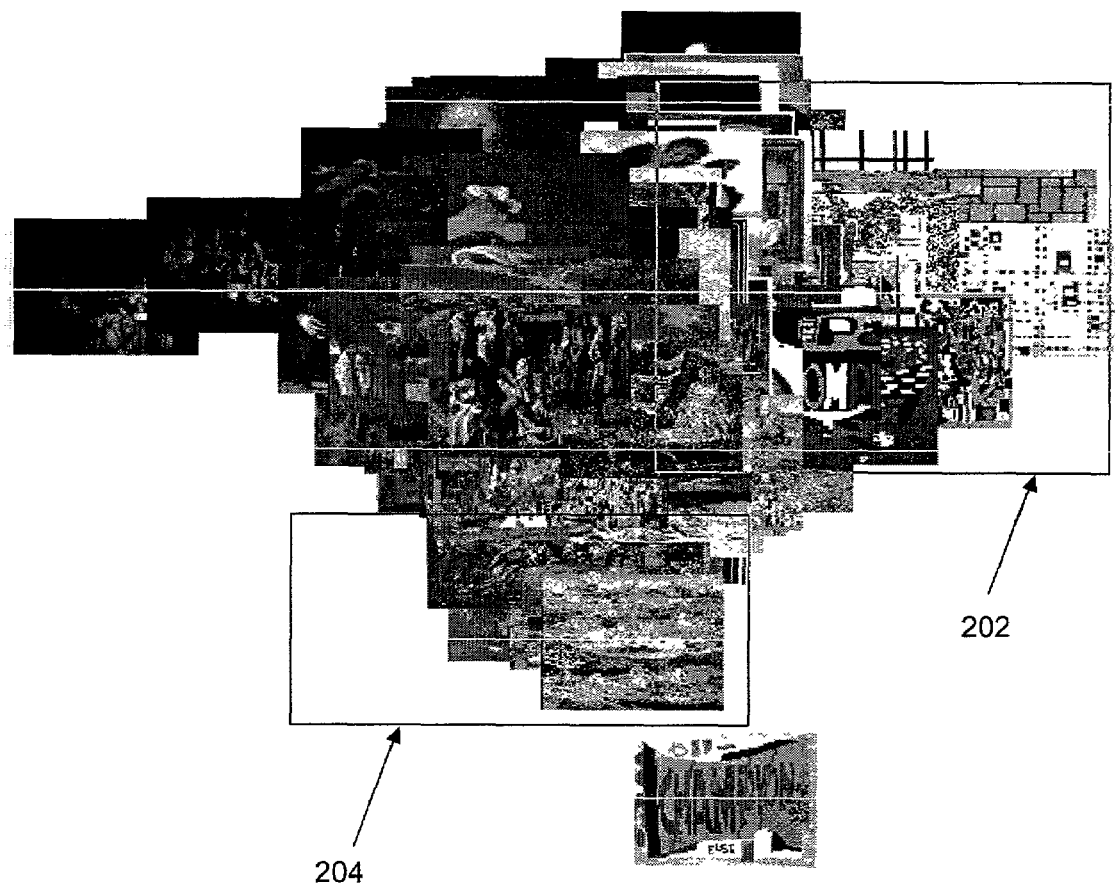
FIGS. 2A-2E show screen captures of progressive levels of displays generated by the present invention.

FIGS. 2A-2E show a graphical representation of displays generated by the present invention, where each portion of the images redisplayed, as shown in the subsequent figure, can be graphically selected by a user. FIG. 2A is a screen capture of an exemplary display showing a first level of the images representing data files on a two-dimensional display. There are more than one thousand images displayed in FIG. 2A. As can be seen in FIG. 2A, the images are not very distinguishable and there are many images that are obscured due to overlapping of the images. Therefore, generating a precise distance between images is not advantageous, because the finer details that separated images are indistinguishable at this resolution. Therefore, a first (i.e., coarse) distance metric can be calculated. However, the first distance metric can still allow the user to receive useful information about the organization of the images on the display. For instance, there are clear trends from dark to light colors going from left to right. Another visible trend is from top to bottom, where the images tend to go from softer images to images with distinct edge lines.

Based on the perceived properties of a desired image, a user can select the area 202 of the screen where the desired image most likely resides. Those skilled in the art will appreciate that this selection process can be accomplished by any technique known in the art, such as using a mouse, touch screen, stylus, screen coordinates, keystroke combination, and the like. Additionally, the portion of the images redisplayed can represent images selected from noncontiguous regions of the display. For example, the images can be selected from area 202 and another region 204 located on the lower portion of the display. Alternatively, individual images can be selected. In each case, however, not only are the visible images selected, but all images that are mapped within that space (e.g., the overlapped images).

The overlapping of the center of the display can be several hundred images deep. Therefore, in an alternative embodiment, a display depth indication can be provided that represents an amount of overlapping of images on the display. In combination with the depth display, the user can scroll in and out of the display to view images that were previously not viewable due to the overlapping of the images. For example, a scroll wheel of a mouse can be used to navigate the depth of the images. However, those skilled in the art will appreciate that any known technique for scrolling on a display can be utilized. Additionally, the images could be mapped into a three or higher dimensional space and navigated using virtual reality software and hardware as is known in the art.

Still further, a fixed scale can be established that spans a maximum distance between the plurality of data files. A relative position indicator can also be provided on the fixed scale for each redisplay of the portion selected, thereby providing the user with a reference frame at each level of redisplay. Thus, as the redisplay level increases and the relative separation of the images increases (e.g., see FIGS. 2B to 2D), a user can have a reference that relates back to the first level of the display. The fixed scale can be a linear scale, a logarithmic scale, or a hyperbolic scale. For example, if the distance metric is large between the images, then nonlinear scaling can be used.

Dimensions displayed along the X and Y axes at successive display steps can be different, because the dimensionality reduction process can be run on two different set of datavectors (e.g., images). However, one or both of the dimensions displayed along the X and Y axes can be fixed to increase coherence with the previous display, so that the movement of images is reduced. For example, fixing both dimensions to be the same can be considered the equivalent to performing a simple geometrical zoom operation.

Figure 2B:
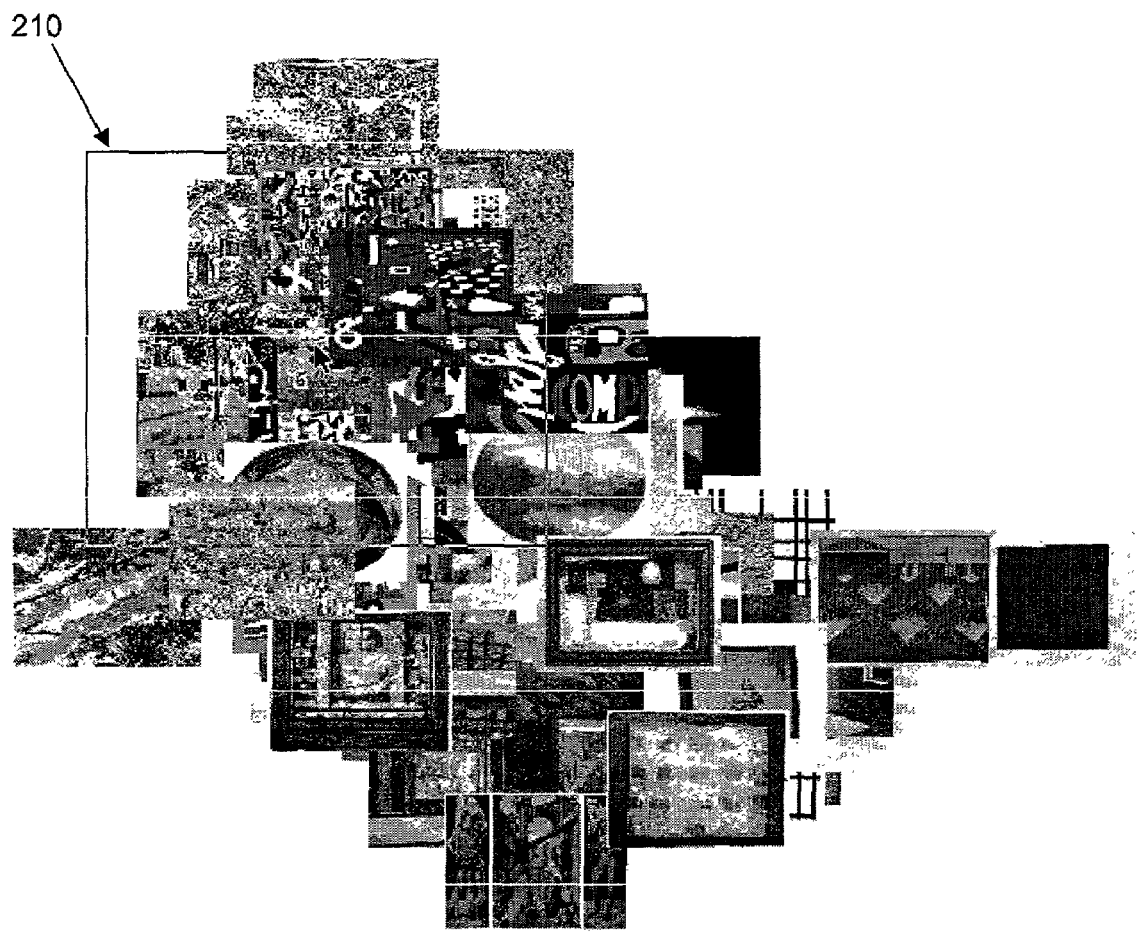
Figure 2C:
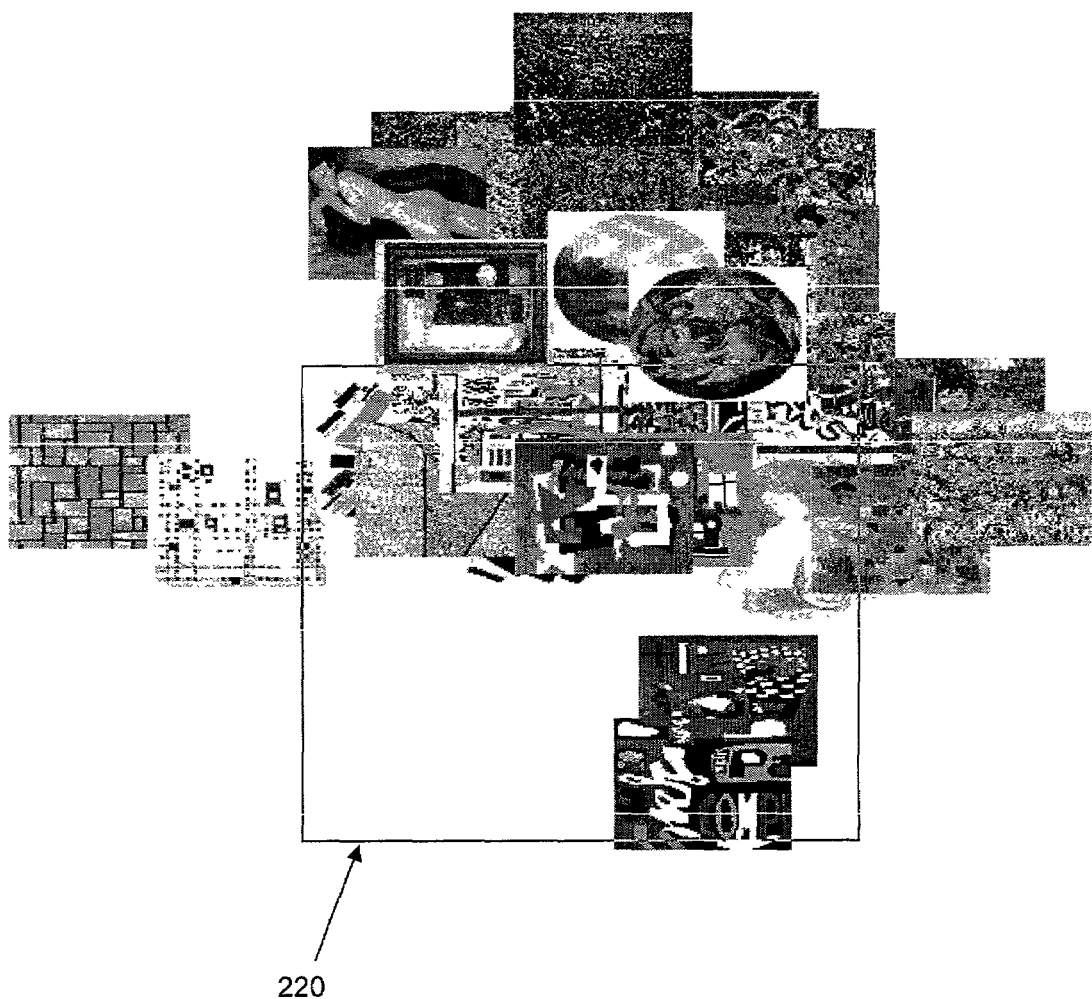
Figure 2D:
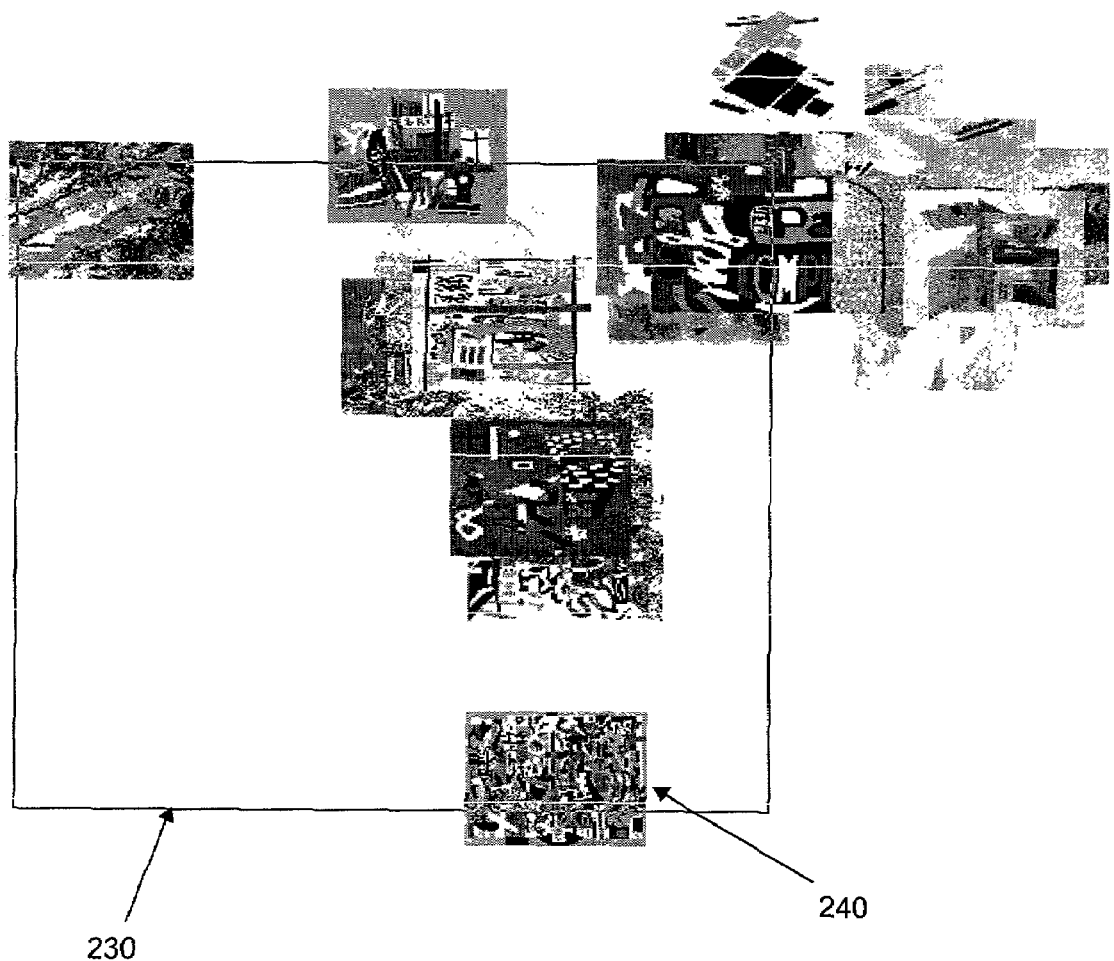
Figure 2E:

FIG. 2B shows a portion of the images redisplayed as selected by area 202. Seventy-eight images are included in this redisplay using a refined distance metric. The distance metric can be recalculated using more of the image information (i.e., feature data) than was used in the first distance calculation. Thus, the reclustering and redisplaying of the selected images are more than merely a "zoom" function. Once again, a user can select a portion 210 of the images at this level for further redisplay. This process can be repeated as shown in FIGS. 2C and 2D. Specifically, FIG. 2C, which is based on the portion 210, contains fifty-one images. The distance metrics between the images at this level can be again recalculated using even more of the image feature data than previously used in relation to FIG. 2B. A portion 220 of the images displayed at this level is selected. FIG. 2D, which is based on portion 220, contains twenty-three images. The distance metrics between the images at this level can be again recalculated using even more of the image feature data than previously used in relation to FIG. 2C. A portion 230 of the display at this level can be further selected. However, at this level the desired data file (i.e., image 240 at the lower portion) is identifiable. Thus, it can be selected and retrieved as shown in FIG. 2E. In this example, the desired data file is an image file. However, the data files can also be video files. In either case, the images that are displayed can be representations of the underlining data file (e.g., a thumbnail image, or a 3D image of an entire video segment) that require less data processing to generate the display.

Figure 3:
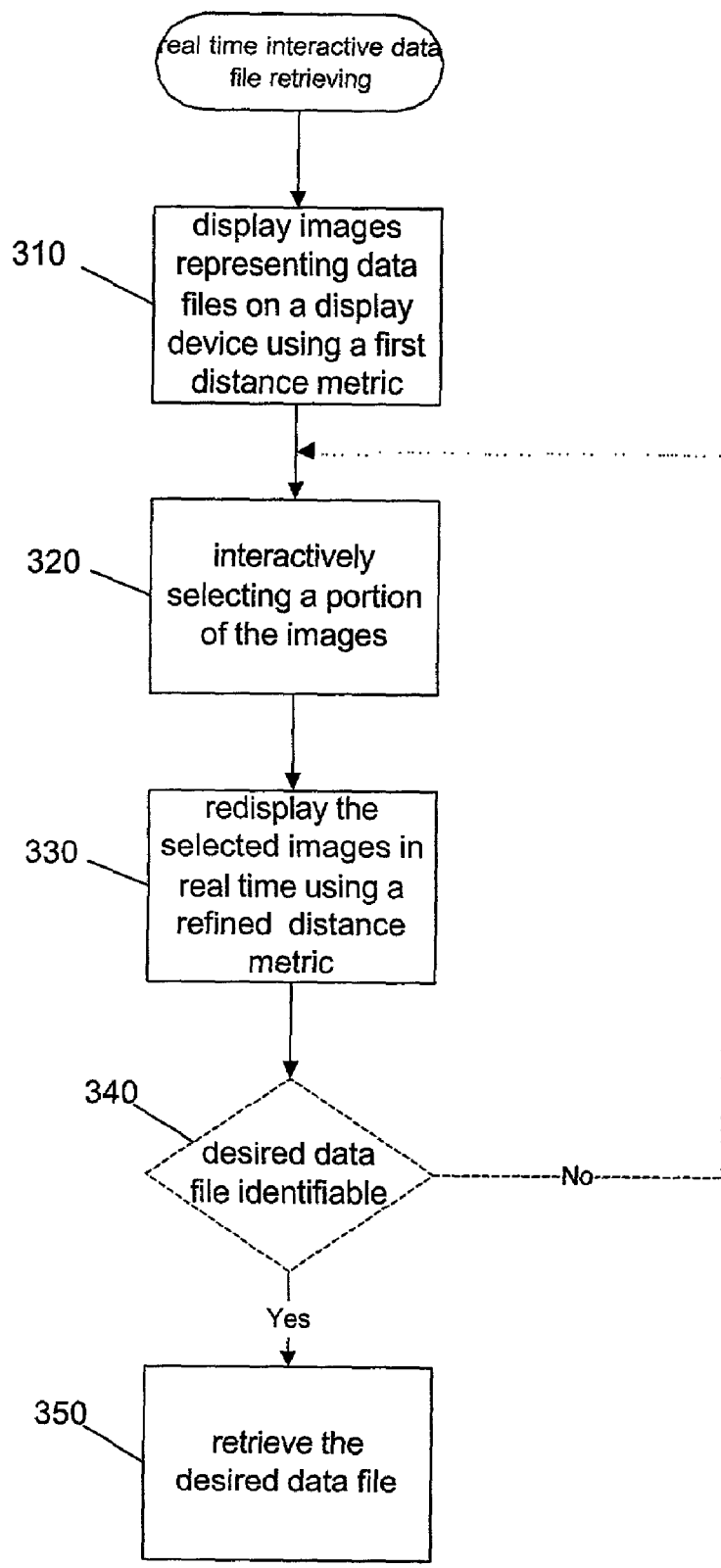
FIG. 3 shows a flow chart of another exemplary method of the present invention.

The previous description provides a basis for understanding the interactivity of the present invention. FIG. 3 shows a flow chart for a method of interactively retrieving data files in real time. In step 310, the process starts by displaying plural images, each image corresponding to a data file, on a display device using a first (i.e., coarse) distance metric between each data file. In step 320, a user interactively selects a portion of the images displayed. The selected images can be redisplayed in real time on the display device using a refined distance metric, in step 330. Optionally, the selecting and redisplaying steps can be repeated until a desired data file is identifiable, in step 340. Those skilled in the art will appreciate that the distance metric can be further refined at each level of redisplay until the maximum refinement of the distance metric is reached or the desired data file is identified. However, the interaction process of the present invention is not limited to the level of maximum refinement of the distance metric. For example, if the refinement only supports a certain number of levels, a user may still browse through additional levels beyond that which is supported. However, these additional levels will use the same distance metric as that supported at the level of maximum refinement of the distance metric.

In step 350, the desired data file can be retrieved. Alternatively, the desired data file could be marked, selected, and the like. Those skilled in the art will appreciate that processing large multimedia databases in real time consumes significant processing power. The prior art systems, such as the previously described Yossi system, rely on complex algorithms, such as Multi-Dimensional Scaling, for mapping the image feature vectors to a 2D space. These systems and algorithms are too slow to work in a real time interactive system, such as the present invention.

Figure 4:
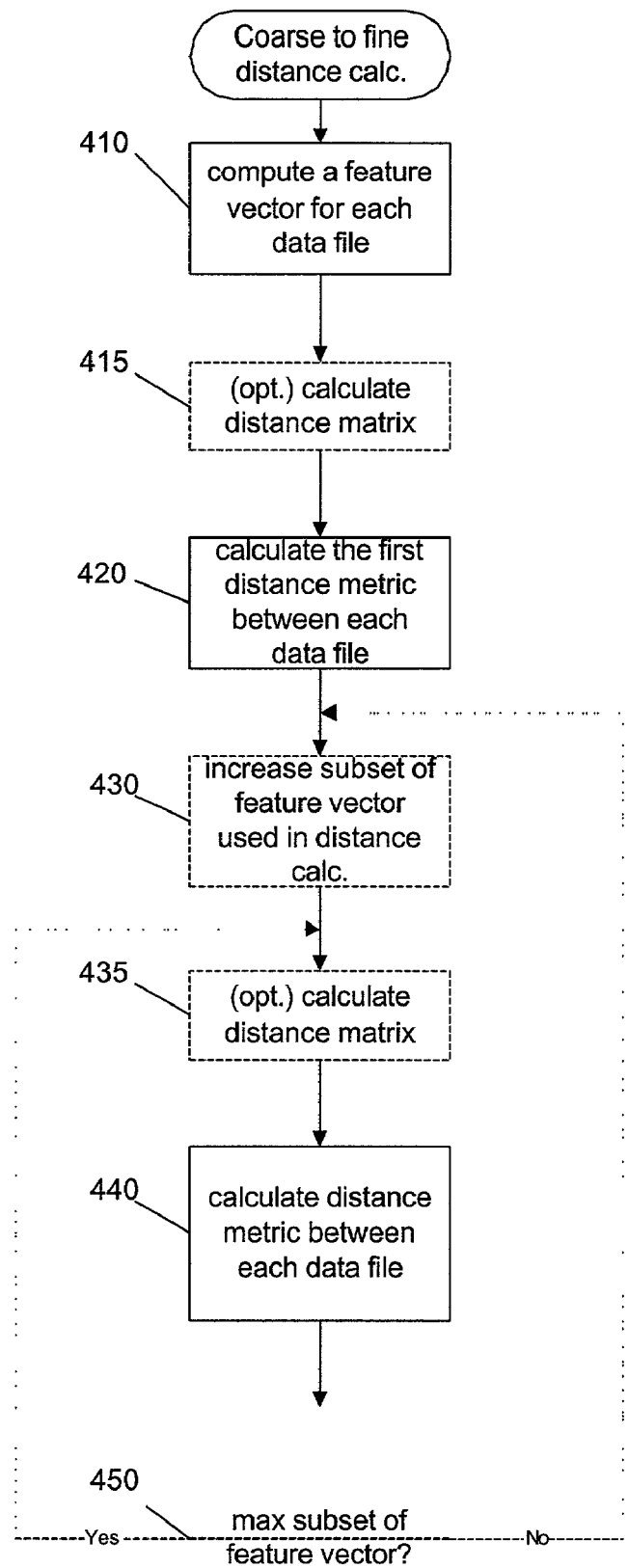
FIG. 4 shows a flow chart of performing a coarse to fine distance calculation of the present invention.

FIG. 4 shows a flow chart for an exemplary method of refining a coarse distance metric, which can be used in connection with the methods described in relation to FIGS. 1 and 3. The process begins in step 410 by computing a feature vector for each data file. This feature vector can be calculated in advance of starting the distance metric refining process. For example, the feature vectors for each image in a large image database can be calculated once and stored in a related database. Therefore, in step 410, the "computing" function would be reduced to the computational effort necessary to retrieve the appropriate image feature vectors. Optionally, in step 415, a distance matrix can be calculated that stores the distance between each image file in a k-by-k matrix (see, Table 1 below), where k is the number of data files. In step 420, the first (i.e., coarse) distance metric can be calculated between each data file using a first subset of data contained in the feature vector. If the distance matrix is calculated, then N-dimensional space mapping can be calculated directly from the distances stored in the distance matrix, as described below.

In step 430, a second subset of data from the feature vector can be established which is greater than the first subset. Once again, a distance matrix can be optionally calculated that stores the distance between each image file to be redisplayed in a matrix, in step 435. In step 440, a second distance metric between each data file can be calculated using the second subset of data. Optionally, steps 430, 435, and 440 can be repeated for each additional redisplay (i.e., the distance metric will be refined for a third, fourth, etc. subsets, wherein each subsequent subset of data is greater than the previous subset). At each redisplay level, a portion of the images can be redisplayed using a refined distance metric that is calculated from a subset of data contained in the feature vector, which is greater than the previous subset. The coarse to fine distance calculation process can continue until the desired data file is identified (i.e., no more redisplay of images) or the maximum data subset is reached (i.e., the finest resolution for the distance calculation), in step 450. However, the interaction process of the present invention is not limited to the level of maximum refinement of the distance metric. For example, if the refinement only supports a certain number of levels, a user may still browse through additional levels beyond that which is supported. However, these additional levels will use the same distance metric as that supported at the level of maximum refinement of the distance metric.

Those skilled in the art will appreciate that the length of the feature vector is a function of the data contained therein. Therefore, the length of the feature vector can be controlled by the type and quantity of feature data used to distinguish the data files. For example, simple images can be distinguished by a color histogram divided into eight separate bins. The ability to distinguish images would be limited to a comparison of the color histograms of each image. Thus, the distance between each image can be calculated using the eight values of the color histogram for each image. Similarly, mapping distances between each data file to N-dimensional space could be any N value. For example, N can be two or three for 2D and 3D display systems, respectively.

As previously noted, the length of the feature vector is a function of the type and quantity of the feature data contained therein. The feature vector can include various feature data related to the data file, for example, color and texture. The selection of the feature data contained in the feature vector can be based on the data files and the system designer's preferences. For example, if the image database contains similar color composition (e.g., images of the lunar surface), then the system can use feature data other than color, such as texture, to distinguish between the images (i.e., establish a distance metric between each of the images). However, a general purpose system can use multiple features, such as a feature vector including at least one of a color histogram, color moment, color coherence histogram, Multiresolution Simultaneous Autoregressive (MRSAR) Model, coarseness, and directionality.

Those skilled in the art will appreciate that the perception of each of these features is not uniform. For example, people are typically more sensitive to color and contrast variation than to texture. Therefore, the feature data can be weighted to reflect the relative perceptibly indicated by that feature. For example, color distance values will be weighted more heavily than texture distance values.

Figure 5A:
FIGS. 5A and 5B show sample images that correspond to the feature vectors of Appendix A.
Figure 5B:

Referring to FIGS. 5A and 5B, images of rock formations that are similar are shown. Associated with these images is Appendix A that contains descriptions and values of an exemplary feature vector for each image. Each feature vector contains two-hundred-thirty-one values and six features describing each image. For example, the first sixty-four data values correspond to Hue Saturation Intensity (HSV) color space represented in a sixty-four bin color histogram. The next six values relate to first and second order color moments in Lab color space (i.e., two orders by three color channels). The next one hundred twenty eight values are a color coherence vector containing a sixty-four bin histogram with sixty-four coherence bins in LUV space. The next fifteen values are MRSAR texture features. The MRSAR texture features of the image can be computed (with resolution levels 2, 3, 4) on overlapping 21×21 subwindows. Tamura coarseness features are the next ten values in the form of a histogram. The ten bin histogram of coarseness values is computed at 1×1, 3×3, 5×5, 9×9, 13×13, 17×17, 21×21, 25×25, 29×29, and 33×33 window sizes. Finally, a Tamura directionality feature is the last eight values. The Tamura directionality features are computed in sixteen directions and represented as an eight bin histogram. However, these features and associated data are not intended to limit the invention, but are only provided as an example of the features and related feature data contained in an exemplary feature vector.

The feature vector can contain a significant amount of detailed data about each data file. However, the goal of the feature vector is to represent the data file in a manner to distinguish each data file from the other data files. Additionally, the feature vector can be used to calculate distances between each data file that corresponds to a person's perception of that data file (e.g., a dark image is closer to other dark images and farther from a light image). Thus, for k images, a k-by-k distance matrix can be formed. Each cell in the matrix represents the distance between corresponding images. A single matrix can contain distance values between all images in a database. An example of an image distance matrix is given below in Table 1. Only the upper or lower half values of the matrix need to be calculated as the values will repeat in the other half (i.e., $d_{1-2}$, the distance from image 1 to image 2 is the same in both halves).

TABLE 1

| Image Number | 1 | 2 | 3 | ... | k |
|---|---|---|---|---|---|
| 1 | 0 | $d_{1-2}$ | $d_{1-3}$ | ... | $d_{1-k}$ |
| 2 | — | 0 | $d_{2-3}$ | ... | $d_{2-k}$ |
| 3 | — | — | 0 | ... | $d_{3-k}$ |
| ... | ... | ... | ... | 0 | ... |
| k | — | — | — | ... | 0 |

Those skilled in the art will appreciate that the first (i.e., coarse) distance measurement can be calculated using less than the total amount of data available in each image feature vector (i.e., a first subset of data contained in the feature vector). At the first level, all of the images in the image database can be displayed, as shown in FIG. 2A. At this level, performing a detailed distance calculation is not beneficial as both the display resolution and the user's perceptual ability do not permit a fine resolution of the distance measurement. For example, when displaying the over on thousand images in FIG. 2A, just gross trends (e.g., dark to light, dominant colors, etc.) of the images are perceptible in the display. Therefore, the first coarse subset can include only the 20% most dominant colors when calculating the distance metric. As the levels of redisplay increase, the percentage of data used to calculate the distance metric increases (i.e., refining the distance metric). For instance, in a five level system the percentage of color histogram data used can increase as shown in Table 2.

TABLE 2

| Level | Value |
|---|---|
| 1 | 20% |
| 2 | 40% |
| 3 | 60% |
| 4 | 80% |
| 5 | 90% |

In the above example, the amount of color histogram data used to calculate the distance metric between each image stops at 90% because the lowest 10% of the color histogram does not significantly add to the quality of the distance calculation. Also, the percentages of data used can be adjusted for different features in the feature matrix just as the different features can be assigned different weights. Alternatively, some features can be excluded at the coarse level distance calculation and included in the finer levels (e.g., MRSAR texture features are not used at first display level, but are used in subsequent redisplay levels). Those skilled in the art will appreciate that the invention is not limited to these techniques. Many other techniques can be used to progressively increase the subset of data used from the feature vector for calculating distances as the redisplay level increases.

In relation to the feature vectors in Appendix A, an example of weight factors for the various features is provided in Table 3.

TABLE 3

| Feature | Weight Factor |
|---|---|
| HSV Histogram | 10.05 |
| Color Moment | 0.15 |
| Color Coherence | 10.50 |
| MRSAR Texture | 0.00001 |
| Coarseness | 10.20 |
| Directionality | 0.10 |

Table 4, below, shows the results of the distance calculation between image 1 as shown in FIG. 5A and image 2 as shown in FIG. 5B, using the feature values provided in Appendix A, the percentages of Table 2 and the weight factors of Table 3.

TABLE 4

| Color Histogram Distance at level 1 | 991522764.0 |
|---|---|
| Color Histogram Distance at level 2 | 1150625795.0 |
| Color Histogram Distance at level 3 | 1058898559.0 |
| Color Histogram Distance at level 4 | 1068628863.0 |
| Color Histogram Distance at level 5 | 1066543477.0 |
| Color Histogram Distance at level 6 | 1066543477.0 |
| Color Histogram Distance at level 2 | 1150625795.0 |
| Color Histogram Distance at level 3 | 1058898559.0 |
| Color Moments Feature Distance | 1018894535.0 |
| Color Coherence Feature Distance | 1024732248.0 |
| MRSAR Texture Feature Distance | 917510700.0 |
| Coarseness Feature Distance | 1034627811.0 |
| Directionality Feature Distance | 1012530938.0 |
| Total Feature Distance (level 1) | 1042418352.0 |
| Total Feature Distance (level 2) | 1150627072.0 |
| Total Feature Distance (level 3) | 1061514170.0 |
| Total Feature Distance (level 4) | 1069936669.0 |
| Total Feature Distance (level 5) | 1067851283.0 |
| Total Feature Distance (level 6) | 1067851283.0 |

Referring to Table 4 and Appendix A, the color histogram distance can be calculated using only a specified percentile of pixels (e.g., Table 2) for comparison at each level. Assume 20% is specified for a given level, then only histogram bins filled by the top 20% most dominant pixels are used. For example, in calculating the color histogram distance, the multilevel distance measure can be used for the first few levels (i.e., given a specified percentile of pixels to use for comparison, such as 20%, only the histogram bins filled by the top 20% most dominant colors are used). This can be performed by sorting the bins of both histograms in descending order. Then, for the histogram in each image feature vector (see, e.g., Appendix A), start from the largest-valued bin and keep marking bins until the specified percentage of pixels is exceeded. Unmarked bins are not used further. Next, reset all marked bins in the histograms to an 'unmatched' status. For each bin in the first histogram, compare it with all unmatched bins in the second. Match it with the best matching bin (e.g., closest in color features) in the second histogram. Mark both as being 'matched'. This procedure can be repeated until all bins in the first histogram are matched or there are no unmatched bins left in the second histogram.

Those skilled in the art will appreciate that there are other ways to implement a multilevel distance measure for histograms. For example, a cumulative histogram can be used. Still further, the number of common bins can simply be counted (e.g., common dominant colors occurring in the top 20% bins of the two histograms).

At deeper levels, a more refined color histogram distance calculation can be performed, as described in the following pseudo code.

```
for (i=0;i<n;i++) {
    result += ((double)(a[i]-b[i])*((double)(a[i]-b[i])));
}
result = sqrt(result);
```

In the above pseudo code, n is the number of bins in the color histograms, a[i] is the value of the ith bin in a first feature vector, and b[i] is the value of the ith bin in a second feature vector. Thus, a Euclidian distance value can be calculated between the color histograms of the first and second feature vectors.

The color moment distances can be determined by a weighted distance calculation that is used for the 6-element moment vector. The color moments can be calculated as illustrated in the following pseudo code.
    double weight[6]={10.2994, 5.0814, 6.8968, 4.2788, 11.2845, 4.9133};

```
result = 0.0;
for (i=0;i<n;i++) {
    result += fabs((double)(a[i]-b[i])) / weight[i];
}
result /= (double)n;
```

In the above pseudo code, n is the number of elements in the color moment vectors, a[i] is the value of the ith color moment element in a first feature vector, b[i] is the value of the ith color moment element in a second feature vector, and weight[i] is a weighting factor for each element. Thus, a weighted absolute distance value can be calculated between the color moments of the first and second feature vectors.

The color coherence distance can be calculated, as illustrated in the following pseudo code.

```
for (i=0;i<n;i++) {
    result += ABS((double)(a[i]-b[i]));
}
result /= (double)n;
```

In the above pseudo code, n is the number of elements in the color coherence vectors, a[i] is the value of the ith color coherence element in a first feature vector, and b[i] is the value of the ith color coherence element in a second feature vector. Thus, an absolute distance value can be calculated between the color coherence elements of the first and second feature vectors.

The MRSAR Texture distance can be calculated as a weighted distance. An example of the pseudo code to accomplish this is given below.
    double weight[15]={4.9027, 4.9030, 0.0458, 0.0458, 6.4940, 3.5638, 5.6881, 4.4322, 0.0380, 7.1009, 0.0713, 0.0772, 0.0342, 0.0344, 7.5016};

```
result = 0.0;
for (i=0;i<n;i++) {
    result += fabs((double)(a[i]-b[i])) / weight[i];
}
result /= (double)n;
```

In the above pseudo code, n is the number of MRSAR Texture elements in the feature vectors, a[i] is the value of the ith MRSAR Texture element in a first feature vector, b[i] is the value of the ith MRSAR Texture element in a second feature vector, and weight[i] is a weighting factor for each element. Thus, a weighted absolute distance value can be calculated between the color moments of the first and second feature vectors.

The coarseness distance can be calculated as illustrated in the following pseudo code.

```
for (i=0;i<n;i++) {
    result += ABS((double)(a[i]-b[i]));
}
result /= (double)n;
```

In the above pseudo code, n is the number of elements in the coarseness vectors, a[i] is the value of the ith coarseness element in a first feature vector, and b[i] is the value of the ith coarseness element in a second feature vector. Thus, an absolute distance value can be calculated between the coarseness elements of the first and second feature vectors.

Similarly, the directionality distance can be calculated as illustrated in the following pseudo code.

```
for (i=0;i<n;i++) {
    result += ABS((double)(a[i]-b[i]));
}
result /= (double)n;
```

In the above pseudo code, n is the number of elements in the directionality vectors, a[i] is the value of the ith directionality element in a first feature vector, and b[i] is the value of the ith directionality element in a second feature vector. Thus, an absolute distance value can be calculated between the directionality elements of the first and second feature vectors.

Once again, these values are for example only and not limitation. Those skilled in the art will appreciate that many factors can influence the specific distance calculation technique, such as the weighting of variables. For example, the user can increase the weighting to emphasize desired image features (e.g., coarseness). In an alternate exemplary embodiment, the distance matrix can be maintained as, for example, six different matrices, one for each feature type (color, texture, coarseness, and so forth), along with the corresponding weights. In such an alternate embodiment, the user can change the relative weighting dynamically.

The Total Feature Distance values provided in Table 4, can be used to populate the distance matrix of Table 1 for each level (i.e., the distance $d_{1-2}$ is 1042418352.0 at the first level, 1150627072.0 at the second level, etc.). The above calculations can be repeated to calculate the distance between every image to complete the image distance matrix.

The process of calculating coarse to fine distance metrics described above reduces the amount of processing power necessary at the lower levels, because the distance calculations are performed on subsets of the feature vector that contain less data at the lower (i.e., coarse) levels. Although the subset of data from the feature vector used to calculate the distance metrics increases at each subsequent level, the number of images decreases at each subsequent level. Therefore, the process is still more efficient than if the entire feature vector is used at each level.

To further improve the processing time, particularly for real time interactive systems, mapping the distances into N-dimensional space (e.g., 2D space) can be calculated using FastMap. FastMap is an algorithm for indexing and visualization of multimedia data files. Particularly, FastMap is an efficient algorithm for calculating distances from high dimensional space (e.g., a distance matrix of N-dimensional vectors) to low dimensional space (e.g., a distance matrix for 2D space) while preserving the relative distance relationships. The distance matrix, as originally calculated, contains distances computed between each pair of high-dimensionality vectors. The size of the distance matrix does not correspond to the dimensionality of the underlying data. For example, each vector can have a length of ten (i.e., ten dimensions). With 200 such vectors, the matrix would be 200×200. FastMap reduces the distance matrix to a distance matrix of the same size (in this example, 200×200) containing distances computed in a lower-dimensional space (for example, 2D or 3D space), with the discarded dimensions being thrown out as residues.

FastMap is described in an article by C. Faloutsos and L. King-Ip, "FastMap: A Fast Algorithm for Indexing, Data-Mining and Visualization of Traditional and Multimedia Datasets", Proceedings of the 1995 International Conference on Management of Data, 1995, pages 163-174, which is hereby incorporated by reference in its entirety. The FastMap algorithm can be applied to the present invention at each level of redisplay. For example, the first distance metrics can be mapped into an N-dimensional (e.g., 2D) space for the first display. Then, the refined distance metrics can be mapped into an N-dimensional space for redisplaying at each subsequent level.

The foregoing has described principles, preferred embodiments and modes of operation of the invention. However, the invention is not limited to the particular embodiments discussed above. For example, the examples above described the present invention in the context of image files. However, those skilled in the art will appreciate that the invention can be used on video files. For instance, a frame by frame analysis of the video file can be performed to generate the feature vector. Therefore, the above-described embodiments should be regarded as illustrative rather than restrictive, and it should be appreciated that variations may be made in those embodiments by those skilled in the art, without departing from the scope of the invention as defined by the following claims.

APPENDIX A

| Vector Field Description | Image 5A | Image 5B |
|---|---|---|
| hsv hist[0] | 0.015725 | 0.013723 |
| hsv hist[1] | 0.003684 | 0.00388 |
| hsv hist[2] | 0.00873 | 0.01009 |
| hsv hist[3] | 0.00257 | 0.003142 |
| hsv hist[4] | 0.003142 | 0.003375 |
| hsv hist[5] | 0.002536 | 0.007205 |
| hsv hist[6] | 0.005096 | 0.005478 |
| hsv hist[7] | 0.109737 | 0.02404 |
| hsv hist[8] | 0.231435 | 0.24531 |
| hsv hist[9] | 0.003053 | 0.003423 |
| hsv hist[10] | 0.00473 | 0.005 |
| hsv hist[11] | 0.00672 | 0.007199 |
| hsv hist[12] | 0.012991 | 0.013399 |

APPENDIX A-continued

| Vector Field Description | Image 5A | Image 5B |
|---|---|---|
| hsv hist[13] | 0.003056 | 0.003294 |
| hsv hist[14] | 0.003962 | 0.004193 |
| hsv hist[15] | 0.003174 | 0.007648 |
| hsv hist[16] | 0.002824 | 0.003171 |
| hsv hist[17] | 0.002794 | 0.003113 |
| hsv hist[18] | 0.003438 | 0.003649 |
| hsv hist[19] | 0.003463 | 0.00368 |
| hsv hist[20] | 0.011039 | 0.01132 |
| hsv hist[21] | 0.002613 | 0.005176 |
| hsv hist[22] | 0.137309 | 0.04714 |
| hsv hist[23] | 0.004708 | 0.004959 |
| hsv hist[24] | 0.008401 | 0.010014 |
| hsv hist[25] | 0.021558 | 0.017975 |
| hsv hist[26] | 0.007147 | 0.007737 |
| hsv hist[27] | 0.002483 | 0.003345 |
| hsv hist[28] | 0.004309 | 0.004555 |
| hsv hist[29] | 0.094836 | 0.127772 |
| hsv hist[30] | 0.006281 | 0.009143 |
| hsv hist[31] | 0.027904 | 0.114393 |
| hsv hist[32] | 0.020035 | 0.019814 |
| hsv hist[33] | 0.003937 | 0.00415 |
| hsv hist[34] | 0.003702 | 0.003911 |
| hsv hist[35] | 0.002639 | 0.003112 |
| hsv hist[36] | 0.009506 | 0.01034 |
| hsv hist[37] | 0.003058 | 0.0033 |
| hsv hist[38] | 0.002865 | 0.003155 |
| hsv hist[39] | 0.002705 | 0.003085 |
| hsv hist[40] | 0.003048 | 0.003292 |
| hsv hist[41] | 0.004748 | 0.005064 |
| hsv hist[42] | 0.002823 | 0.003169 |
| hsv hist[43] | 0.011545 | 0.013752 |
| hsv hist[44] | 0.014392 | 0.01326 |
| hsv hist[45] | 0.005569 | 0.005913 |
| hsv hist[46] | 0.006358 | 0.006962 |
| hsv hist[47] | 0.002388 | 0.003281 |
| hsv hist[48] | 0.021131 | 0.0175 |
| hsv hist[49] | 0.003323 | 0.003529 |
| hsv hist[50] | 0.003274 | 0.003496 |
| hsv hist[51] | 0.002996 | 0.017348 |
| hsv hist[52] | 0.00279 | 0.003335 |
| hsv hist[53] | 0.014599 | 0.023894 |
| hsv hist[54] | 0.003977 | 0.004203 |
| hsv hist[55] | 0.018001 | 0.016744 |
| hsv hist[56] | 0.008352 | 0.008994 |
| hsv hist[57] | 0.017086 | 0.016152 |
| hsv hist[58] | 0.00255 | 0.003322 |
| hsv hist[59] | 0.005808 | 0.006252 |
| hsv hist[60] | 0.004154 | 0.004367 |
| hsv hist[61] | 0.005096 | 0.005436 |
| hsv hist[62] | 0.002681 | 0.003192 |
| hsv hist[63] | 0.023416 | 0.019133 |
| color moment [0] | 71.268158 | 67.481941 |
| color moment [1] | 18.362003 | 17.803455 |
| color moment [2] | 9.894927 | 10.658245 |
| color moment [3] | 5.043429 | 4.898332 |
| color moment [4] | 1.124696 | 0.833566 |
| color moment [5] | 2.179271 | 3.589482 |
| color coherence hist[0] | 0.004023 | 0.003164 |
| color coherence hist[1] | 0.003773 | 0.003078 |
| color coherence hist[2] | 0.003788 | 0.003157 |
| color coherence hist[3] | 0.216005 | 0.122567 |
| color coherence hist[4] | 0.00451 | 0.003623 |
| color coherence hist[5] | 0.005861 | 0.00492 |
| color coherence hist[6] | 0.005449 | 0.004366 |
| color coherence hist[7] | 0.007247 | 0.006423 |
| color coherence hist[8] | 0.006292 | 0.005233 |
| color coherence hist[9] | 0.006592 | 0.005208 |
| color coherence hist[10] | 0.006716 | 0.00521 |
| color coherence hist[11] | 0.006974 | 0.005804 |
| color coherence hist[12] | 0.005557 | 0.004788 |
| color coherence hist[13] | 0.189305 | 0.112322 |
| color coherence hist[14] | 0.0088 | 0.007137 |
| color coherence hist[15] | 0.005152 | 0.004244 |
| color coherence hist[16] | 0.00534 | 0.004335 |
| color coherence hist[17] | 0.008665 | 0.007897 |
| color coherence hist[18] | 0.008904 | 0.007059 |
| color coherence hist[19] | 0.004087 | 0.00337 |

APPENDIX A-continued

| Vector Field Description | Image 5A | Image 5B |
|---|---|---|
| color coherence hist[20] | 0.009935 | 0.008478 |
| color coherence hist[21] | 0.009591 | 0.007582 |
| color coherence hist[22] | 0.013121 | 0.010153 |
| color coherence hist[23] | 0.018113 | 0.091666 |
| color coherence hist[24] | 0.004878 | 0.004149 |
| color coherence hist[25] | 0.00552 | 0.004318 |
| color coherence hist[26] | 0.004713 | 0.003696 |
| color coherence hist[27] | 0.007794 | 0.006343 |
| color coherence hist[28] | 0.00504 | 0.003976 |
| color coherence hist[29] | 0.012787 | 0.01112 |
| color coherence hist[30] | 0.014691 | 0.012139 |
| color coherence hist[31] | 0.006159 | 0.005285 |
| color coherence hist[32] | 0.006352 | 0.005076 |
| color coherence hist[33] | 0.006713 | 0.005405 |
| color coherence hist[34] | 0.006002 | 0.004996 |
| color coherence hist[35] | 0.004416 | 0.003586 |
| color coherence hist[36] | 0.00647 | 0.005556 |
| color coherence hist[37] | 0.025783 | 0.0161 |
| color coherence hist[38] | 0.004595 | 0.003764 |
| color coherence hist[39] | 0.007727 | 0.006179 |
| color coherence hist[40] | 0.005626 | 0.004481 |
| color coherence hist[41] | 0.009352 | 0.007588 |
| color coherence hist[42] | 0.009523 | 0.007438 |
| color coherence hist[43] | 0.004594 | 0.003886 |
| color coherence hist[44] | 0.008157 | 0.00708 |
| color coherence hist[45] | 0.010747 | 0.008226 |
| color coherence hist[46] | 0.00654 | 0.005312 |
| color coherence hist[47] | 0.015174 | 0.032166 |
| color coherence hist[48] | 0.004969 | 0.004002 |
| color coherence hist[49] | 0.009231 | 0.008031 |
| color coherence hist[50] | 0.005052 | 0.004225 |
| color coherence hist[51] | 0.00614 | 0.004959 |
| color coherence hist[52] | 0.008388 | 0.006818 |
| color coherence hist[53] | 0.009767 | 0.0079 |
| color coherence hist[54] | 0.005716 | 0.004448 |
| color coherence hist[55] | 0.004282 | 0.003473 |
| color coherence hist[56] | 0.007149 | 0.005603 |
| color coherence hist[57] | 0.012766 | 0.009913 |
| color coherence hist[58] | 0.008568 | 0.007078 |
| color coherence hist[59] | 0.014867 | 0.01175 |
| color coherence hist[60] | 0.016085 | 0.012216 |
| color coherence hist[61] | 0.007843 | 0.007422 |
| color coherence hist[62] | 0.005253 | 0.004328 |
| color coherence hist[63] | 0.008265 | 0.006359 |
| color coherence hist[64] | 0.000417 | 0.001191 |
| color coherence hist[65] | 0.000445 | 0.001208 |
| color coherence hist[66] | 0.000469 | 0.001153 |
| color coherence hist[67] | 0.002368 | 0.008199 |
| color coherence hist[68] | 0.000501 | 0.001315 |
| color coherence hist[69] | 0.000746 | 0.001847 |
| color coherence hist[70] | 0.000594 | 0.001744 |
| color coherence hist[71] | 0.001057 | 0.002341 |
| color coherence hist[72] | 0.000805 | 0.002158 |
| color coherence hist[73] | 0.000664 | 0.002012 |
| color coherence hist[74] | 0.000672 | 0.001938 |
| color coherence hist[75] | 0.000854 | 0.002042 |
| color coherence hist[76] | 0.00075 | 0.00173 |
| color coherence hist[77] | 0.009691 | 0.04922 |
| color coherence hist[78] | 0.001046 | 0.003142 |
| color coherence hist[79] | 0.000629 | 0.001667 |
| color coherence hist[80] | 0.000624 | 0.00175 |
| color coherence hist[81] | 0.001365 | 0.003008 |
| color coherence hist[82] | 0.000942 | 0.002472 |
| color coherence hist[83] | 0.000491 | 0.001224 |
| color coherence hist[84] | 0.001288 | 0.002842 |
| color coherence hist[85] | 0.001058 | 0.003211 |
| color coherence hist[86] | 0.001177 | 0.00367 |
| color coherence hist[87] | 0.031716 | 0.032868 |
| color coherence hist[88] | 0.00064 | 0.001516 |
| color coherence hist[89] | 0.000554 | 0.001641 |
| color coherence hist[90] | 0.000485 | 0.001378 |
| color coherence hist[91] | 0.000914 | 0.002324 |
| color coherence hist[92] | 0.000531 | 0.001462 |
| color coherence hist[93] | 0.001759 | 0.003862 |
| color coherence hist[94] | 0.007603 | 0.029164 |
| color coherence hist[95] | 0.000825 | 0.001934 |
| color coherence hist[96] | 0.00067 | 0.002016 |
| color coherence hist[97] | 0.000765 | 0.00224 |
| color coherence hist[98] | 0.000754 | 0.001938 |
| color coherence hist[99] | 0.000507 | 0.001299 |
| color coherence hist[100] | 0.000862 | 0.00197 |
| color coherence hist[101] | 0.001368 | 0.011449 |
| color coherence hist[102] | 0.000551 | 0.001491 |
| color coherence hist[103] | 0.000829 | 0.002553 |
| color coherence hist[104] | 0.00061 | 0.001628 |
| color coherence hist[105] | 0.00095 | 0.00301 |
| color coherence hist[106] | 0.00091 | 0.002861 |
| color coherence hist[107] | 0.000591 | 0.001408 |
| color coherence hist[108] | 0.001117 | 0.002497 |
| color coherence hist[109] | 0.001034 | 0.003023 |
| color coherence hist[110] | 0.000773 | 0.00215 |
| color coherence hist[111] | 0.001369 | 0.00824 |
| color coherence hist[112] | 0.000559 | 0.0016 |
| color coherence hist[113] | 0.001379 | 0.003494 |
| color coherence hist[114] | 0.00063 | 0.00152 |
| color coherence hist[115] | 0.000691 | 0.001767 |
| color coherence hist[116] | 0.000997 | 0.002712 |
| color coherence hist[117] | 0.001088 | 0.002642 |
| color coherence hist[118] | 0.000573 | 0.001678 |
| color coherence hist[119] | 0.000496 | 0.001377 |
| color coherence hist[120] | 0.000739 | 0.002043 |
| color coherence hist[121] | 0.001223 | 0.008437 |
| color coherence hist[122] | 0.001043 | 0.00262 |
| color coherence hist[123] | 0.001577 | 0.004085 |
| color coherence hist[124] | 0.001428 | 0.004183 |
| color coherence hist[125] | 0.001327 | 0.002705 |
| color coherence hist[126] | 0.000629 | 0.001561 |
| color coherence hist[127] | 0.000788 | 0.002401 |
| mrsar[0] | 0.212689 | 0.272248 |
| mrsar[1] | 0.163482 | 0.137797 |
| mrsar[2] | 0.034149 | 0.073859 |
| mrsar[3] | 0.077726 | 0.010841 |
| mrsar[4] | 4.501686 | 5.894232 |
| mrsar[5] | 0.219733 | 0.253722 |
| mrsar[6] | 0.162578 | 0.148302 |
| mrsar[7] | 0.024047 | 0.06795 |
| mrsar[8] | 0.056763 | 0.008772 |
| mrsar[9] | 5.530945 | 7.133299 |
| mrsar[10] | 0.212373 | 0.236019 |
| mrsar[11] | 0.149553 | 0.140585 |
| mrsar[12] | 0.024465 | 0.069913 |
| mrsar[13] | 0.049384 | 0.007728 |
| mrsar[14] | 6.170992 | 8.024147 |
| coarseness[0] | 0.159145 | 0.169511 |
| coarseness[1] | 0.068574 | 0.073884 |
| coarseness[2] | 0.057339 | 0.071561 |
| coarseness[3] | 0.019682 | 0.024802 |
| coarseness[4] | 0.039972 | 0.043701 |
| coarseness[5] | 0.045226 | 0.042587 |
| coarseness[6] | 0.046261 | 0.037436 |
| coarseness[7] | 0.048805 | 0.041868 |
| coarseness[8] | 0.067705 | 0.060949 |
| coarseness[9] | 0.447291 | 0.433702 |
| directionality[0] | 0.046838 | 0.431484 |
| directionality[1] | 0.058548 | 0.197055 |
| directionality[2] | 0.30445 | 0.098528 |
| directionality[3] | 0.105386 | 0.029445 |
| directionality[4] | 0.064403 | 0.0453 |
| directionality[5] | 0.087822 | 0.069083 |
| directionality[6] | 0.117096 | 0.053228 |
| directionality[7] | 0.215457 | 0.075878 |

What is claimed is:

1. A method of visualizing and retrieving a data file from a set of data files comprising:
    displaying a plurality of images representing corresponding data files on a display device using a first distance metric between each data file;
    redisplaying a portion of the images on the display device using a refined distance metric; and
    performing at least one of retrieving, marking, and selecting at least one desired data file.

2. The method of claim 1, further comprising:

repeating the redisplaying step until a desired data file is identifiable.

3. The method of claim 1, wherein the first distance metric is calculated by a method comprising:

computing a feature vector for each data file; and calculating the first distance metric between each data file using a first subset of data contained in the feature vector.

4. The method of claim 3, wherein the refined distance metric is calculated by a method comprising:

calculating a second distance metric between each data file using a second subset of data contained in the feature vector which is greater than the first subset.

5. The method of claim 4, wherein the step of computing the feature vector comprises:

computing the feature vector for each data file before starting the method;

storing the feature vector for each data file; and accessing the feature vector for each data file.

6. The method of claim 4, wherein each feature vector has a length of at least eight.

7. The method of claim 4, wherein the feature vector includes at least one of a color feature and a texture feature.

8. The method of claim 4, wherein the feature vector includes at least one of a color histogram, color moment, color coherence histogram, Multiresolution Simultaneous Autoregressive (MRSAR) Model, coarseness, and directionality.

9. The method of claim 1, wherein the first distance metrics are mapped into an N-dimensional space using FastMap for displaying and wherein the refined distance metrics are mapped into an N-dimensional space using FastMap for redisplaying.

10. The method of claim 9, wherein N is two or three.

11. The method of claim 1, wherein the data files are image files.

12. The method of claim 1, wherein the data files are video files.

13. The method of claim 1, further comprising:

establishing a fixed scale that spans a maximum distance between the plurality of data files; and indicating a relative position on the fixed scale for the redisplay of the portion of the images, thereby providing the user with a reference frame.

14. The method of claim 1, wherein the fixed scale is at least one of a linear scale, a logarithmic scale, and a hyperbolic scale.

15. The method of claim 1, further comprising:

providing a display depth indication that represents an amount of overlapping of images on the display; and scrolling to view images that were previously not viewable due to overlapping of the images.

16. The method of claim 1, wherein the portion of the images redisplayed is graphically selected by the user.

17. A method of interactively retrieving a data file from a set of data files in real time comprising:

displaying a plurality of images, each image corresponding to a data file, on a display device using a first distance metric between each data file;

interactively selecting, by a user, a portion of the images;

redisplaying the portion of the images in real time on the display device using a refined distance metric; and retrieving a desired data file.

18. The method of claim 17, wherein the first distance metric is calculated by a method comprising:

computing a feature vector for each data file; and calculating the first distance metric between each data file using a first subset of data contained in the feature vector.

19. The method of claim 18, wherein the refined distance metric is calculated by a method comprising:

calculating a second distance metric between each data file using a second subset of data contained in the feature vector which is greater than the first subset.

20. The method of claim 19, wherein the first distance metrics are mapped into a N-dimensional space using FastMap for displaying and second distance metrics are mapped into a N-dimensional space using FastMap for redisplaying.

* * * * *